United States Patent [19]
Toro

[11] Patent Number: 5,894,611
[45] Date of Patent: Apr. 20, 1999

[54] WATERPROOF BATH WATER LEVEL AUDIO ALARM

[76] Inventor: Egberto Toro, 8817 Bel Air Rd., Perry Hall, Md. 21236

[21] Appl. No.: 09/146,758

[22] Filed: Sep. 4, 1998

[51] Int. Cl.[6] .................................................. A47K 3/00
[52] U.S. Cl. ........................... 4/559; 4/661; 340/616
[58] Field of Search ............................ 4/559, 546, 496, 4/661, 314, 668, 538; 137/406, 386; 340/616, 612, 618, 624; 200/84 R, 61.04, 61.2

[56] References Cited

U.S. PATENT DOCUMENTS

| | | | |
|---|---|---|---|
| 3,969,942 | 7/1976 | Hope et al. | 73/302 |
| 3,984,877 | 10/1976 | Kirby | 4/314 |
| 4,258,444 | 3/1981 | Orszullok | 4/668 |
| 4,546,346 | 10/1985 | Wave et al. | 340/608 |
| 4,800,372 | 1/1989 | Potest | 340/625 |

Primary Examiner—David J. Walczak
Attorney, Agent, or Firm—Peter Gibson

[57] ABSTRACT

A diaphragm switch having a lower contact on the upper, interior, surface of a flexible membrane is pressed upward against an upper contact when the membrane is displaced upward by a rising water level. Closing of this diaphragm switch completes an electrical circuit including a power source, an annunciator, and wiring causing an alarm to be sounded indicating that a certain water level has been attained. The alarm may be silenced with release of an on/off switch or the alarm, attached by suction to an interior surface of a bathtub wall, may be displaced upward or removed. Catching the on/off switch sets the alarm and a visual indicator light may indicate this state. The top surface of the alarm may be a platform for a soap bar. The entire alarm is waterproof. Different standard sized batteries and appropriate enclosures permitting replacement are suggested.

20 Claims, 3 Drawing Sheets

WATERPROOF BATH WATER LEVEL AUDIO ALARM

BACKGROUND OF THE INVENTION

1. Field of the Invention

The field of the present invention relates generally to bath tubs, more specifically to devices associated with bath tubs, and most particularly to such devices intended to sound an alarm activated by the water in a bath tub attaining a predetermined level therein

2. General Background

The drawing of a bath is a routine familiar to most inhabitants of the U.S.A wherein a private bath tub has been a commonplace luxury for decades. Many people prefer a shower to a bath, particularly as a part of a morning routine preparatory to dressing for the day, for various reasons including exigencies of time. A bath requires time to draw, in opposition to a shower, which may commence as soon as the temperature of the water has been satisfactorily adjusted. A bath tub, however, requires at least several minutes after adjustment of the water temperature to fill to a suitable level for bathing.

Many other people prefer baths over showers on a daily basis. And many people who routinely shower in the morning preparatory to dressing and commonly rush off to work who haven't even several minutes for drawing a proper bath still appreciate a nice hot soak in a bath upon other occasions. A hot bath is generally appreciated by adults as a relaxing and enjoyable pleasure and for many a bath constitutes a therapeutic activity, quite aside from the cleansing obtained thereby.

But the drawing of a bath requires some time which many cannot spare in their morning routine and which others simply find to be tedious. Standing or sitting alongside a bath tub filling is perhaps inherently annoying because one desires it to be full and cannot expedite its filling by any means. Typically one has undressed prior drawing a bath and desires only to enjoy the bath. The predicament is not unlike waiting for the kettle to boil when desirous of a hot cup of tea or coffee. The difference however, in this analogy, is that the kettle possesses a whistle while the bath does not.

The bath, lacking any means of signalling or indicating to one sufficiently remote from the tub to have lost a view of the water level therein, demands watching and, hence, one's proximity. Unfortunately there is normally little else one requires or desires doing within a bathroom while waiting for the tub to fill other than entering the filled tub. One would like, perhaps, to brew a cup of tea or coffee in the meantime, have a muffin or attend to some other task in another room such as the kitchen, which is invariably remote from the bathroom. To do so while drawing a bath, however, to leave the tub while it is filling, is to invite domestic disaster as many bath tubs require more time to attain a level suitable for bathing than do the same tubs require to overflow after reaching the desired level.

The ability of an unattended bath tub to overflow is perhaps well known. Although the tub is typically equipped with an overflow drain the opening of the same is often woefully undersized and ill equipped to handle the full flow available to the bath tub. The reasons for this are not wholly clear though conjecture suggests that historical development as well as certain practical considerations are responsible. Historically, bath tubs have decreased in volume at the same time that water pressure, and the rate of available flow, have increased rather dramatically. The larger capacity of water heaters today as opposed to those typical of a residence forty years ago is another factor. The overflow drain, however, perhaps by force of habit, has not increased in size.

Alternatively, if the overflow drain were large enough to accommodate the full flow of water from a modern system, the drain would no longer possess a size which would readily fit conventional tubs or perhaps the drain pipe typically utilized while a sufficiently enlarged overflow drain might overwhelm a typical drain pipe. The water drains by virtue of gravity. The water filling the tub is supplied under pressure. Unless the drain pipe is enlarged considerably over that typically utilized the full flow commonly utilized in filling a tub might overwhelm the capacity of the drain to remove the excess. One might adjust the flow of the water into the tub to a lower rate which the overflow drain could accommodate, but this would rather defeat the purpose, as the time to draw the bath would be increased several fold.

The consequences of overfiling a bath vary with the degree of overflow which is commensurate with the time one has left the bath overfilling. At the minimum an amount of water upon the floor sufficient to soak a bath mat and requiring additional means of mopping up is concerned. Given a little more time a significant amount of water damage readily results. The extent of water damage achievable varies as well. The walls of the room beneath an overflowed bath may need repainting, or resurfacing, or replacement. Serious structural damage is not out of the question. In short, overflowing a bath is at minimum a nuisance and at worst a minor catastrophe and quite expensive.

Given the annoyance associated with filling and the nuisance and potential for damage caused by overflowing a bath tub, one might wonder why there is no device available which would simply sound an alarm upon achieving the desired level of water in the tub. The matter seems, on its surface, a simple one. But there have been, as evidenced below in discussion of the pertinent prior art, many attempts at achieving such a device. Consideration of these devices and the underlying principles to the same yields, if one will permit, a depth to the matter unforeseen to the casual eye.

DISCUSSION OF THE PRIOR ART

Four U.S. Patents are known which provide automatic control of the level of water in a bath tub. While this may be considered less than directly pertinent to the present invention consideration of these references yields at least one insight into the nature of the general problem. Listed in chronological order these patents are:

| | | | |
|---|---|---|---|
| 4,042,984 | Butler | Aug. 23 1977 | Automatic Bathtub Water Level Control System |
| 4,258,444 | Orszullok | Mar. 31 1981 | Bath Water Level Control System |
| 4,563,780 | Pollack | Jan. 14 1981 | Automated Bathroom |
| 4,607,658 | Fraser et al. | Aug. 26 1986 | Water Level Control Device |
| Egberto Toro | Waterproof Bath Water Level Audio Alarm | | September 4, 1998 |

The control system disclosed by Butler utilizes solenoids and "an electric control circuit" including three switching means and "electric timing means" such as a clock motor similar to that controlling the operation of a washing machine to initiate and terminate the flow of water into a bath tub in coordination with closing and opening of the drain plug. A temperature mixing valve which also controls flow is manually preset. One solenoid valve controls the water inlet flow and a second solenoid valve controls the drain plug. Parallel manual means of operation is also provided. The system comprises a combination including the bath tub. In other words the system can not be retrofitted to an already existing bath tub but must be installed altogether.

The control system disclosed by Orszullok utilizes "a threaded spindle rotatably mounted adjacent" a wall of the tub with a "nut supported on said spindle" which carries a "capacitive proximity switch". The spindle is rotated, preferably by means of a gear coupled knob through the "rosette" comprising the cover to the overflow drain. The proximity switch activates either a solenoid for closing water flow into the tub or an alarm. Although the tub is not necessarily included in the innovation claimed a portion of the tub must be "non-conductive" in order for the proximity switch to operate. Precisely how the water level, upon reaching the preset level of the proximity switch, actually closes this switch is not explained.

Pollack discloses a system strikingly similar to that disclosed by Butler but further including "means for sensing the temperature of the water in the supply line after it has been mixed" which, after sensing the desired temperature, directs the water flow either into the tub rather than down the drain line. A shower head and a sink faucet are also encompassed in addition to a bath tub faucet. And a "computer" is utilized to co-ordinate various activities such the addition of bath oils, cleaning solutions, and valve actuation which may further be used with other devices such as a digital scale or "with speech synthesizers so that, for example, a child can be reminded to brush his teeth."

Fraser et al. disclose a system which relies upon less sophisticated if no less optimistic a means of operation. A tube disposed vertically within the tub has at the top a diaphragm on top of which is a mechanical linkage to a valve located within the faucet. "Various water levels can be selected by opening pressure relief openings in the tube." Regardless of the efficacy of utilizing air pressure to close a valve via a mechanical linkage the matter of the supply line pressure is apparently neglected. The air pressure operated valve installed in the faucet evidently overcomes the supply line pressure:

> The valve 14 is installed in a spout 20, and may, if desired, be identical to a stopper-type valve having a stopper 22 which, when the valve 14 is lifted, halts water flow from the spout 20. Such a valve is normally used in conjunction with a shower for a bathtub, but the shower would be eliminated in connection with the preferred embodiments of the present invention. (column 2, lines 41–47)

In review of the above it is noted that the first system must be installed together with the bath tub and requires electrical operation of solenoid valves; the second requires a plastic bath tub and relies upon the sensing of water level by a capacitive proximity switch through the wall of the tub by physical principles unspecified; the third adds a temperature sensor to the first and suggests computer control of a variety of bathroom activities; the fourth relies upon air pressure in a tube created by the rising level of the water in the tub to simply halt the flow of water through the spout with a stopper. Without intended disparagement of any of these innovations it is merely noted that what is considered the most feasible of the lot requires a whole new installation and electrically operated solenoid valves which is, as commented upon in the fourth reference, somewhat complex, not to mention expensive and perhaps of little appeal to the owner of an already existing bathroom with tub already installed therein.

While controlling the water flow into a bath tub is considered to be rather understandably more than a simple matter, it would seem that merely indicating the level obtained by the water in the tub would be simple indeed. A review of the art concerned particularly with this one problem may, however, indicate otherwise. Seven U.S. Patents known as addressing this specific task are listed below:

| 1,168,699 | Arbib | Jan. 18, 1916 | Water Level Actuated Mechanism |
| 2,041,549 | Jaeger | May 19, 1936 | Alarm Device |
| 2,602,846 | Polikoff | July 8, 1952 | Electric Alarm Apparatus For Bathtubs |
| 4,080,985 | Eagle | Mar. 28, 1978 | Water Level Alarm Apparatus |
| 4,757,305 | Peso | July 12, 1988 | Water Level Indicator |
| 4,771,272 | Barnes | Sep. 13, 1988 | Pendent Liquid Level Alarm Apparatus |
| 5,661,462 | Shrewsbury-Gee | Aug. 26, 1997 | Bath Overflow Alarm |

Arbib discloses an alarm bell upon a shelf interiorly dependent from the rim of a tub possessing an exposed electrical contact closed by a downward displacement of one end of a pivoted arm caused by the upward displacement of the other end of the arm resulting from the water level obtaining a height sufficient to float a buoyant weight hanging therefrom.

Jaeger discloses an alarm bell inside a box screwed to a wall above the tub extending outward and having at the distal end two parallel conductive rods each wired to the alarm, one having a pivoted float attached thereto with an end which contacts the other conductive rod when the float obtains a substantially horizontal position.

Polikoff discloses an alarm bell within a box having a suction cup on a side for removable attachment to the interior surface of a bath tub wall which is actuated by a float comprising the hinged bottom to the box.

Eagle discloses an alarm bell disposed exteriorly to the wall of "a container such as a bathtub, swimming pool or the like" connected in series with batteries disposed above the wall of the container having an electrical contact in a portion of the apparatus extending outwardly from the wall above the water positioned above a tube in which a float is "slideably confined". A solenoid valve is also recommended to halt the flow of water into the "container".

Peso discloses a "water level indicator useful for signalling a plurality of different water levels within a bathtub" which clamps to the wall of the tub and has a tube extending downward into the rising water with a float confined therein possessing a rod extending upward from the same possessing a number of metallic bands each of which is capable of closing an electrical contact comprised of opposed sides of an aperture through which the rod passes with ascent of the float within the tube.

Barnes discloses an alarm hung exteriorly from a wall of a tub connected by means of a "flexible electrical cable" to a sensor comprised of a tube with a float having a magnet at the top which closes a reed, i.e. proximity, switch mounted in an upper cap of the tube. A suction cup attached to the cable between the pendent alarm and the pendent sensor is also disclosed.

Shrewsbury-Gee discloses an alarm inside a truncated cylindrical shell with a central aperture intended to fit over a typical round bath tub overflow drain cover possessing a "pair of water contacts secured within":

A pair of water contacts 48 are secured within the hollow interior of the circular housing 12. The pair of water contacts 48 are positioned above the pair of slots 22. The pair of water contacts 48 are electrically coupled with the battery 38. The pair of water contacts 48 each have a first end 50 extending through the dividing wall 32 into the lower section 30 to be contacted by incoming water through the pair of slots 22. The pair of water contacts 48 each have a second end 52 within the upper section 28 of the hollow interior of the circular housing 12 protected from contact with the water entering into the circular housing 12. The water contacts 48 sense the water level and activate relay circuitry to sound an alarm. (column 4, line 59 through column 5, line 4) No further specifics regarding the operation of these "water contacts" is found.

It is noted that this last reference cited apparently utilizes the water in the tub to close an electrical circuit, although this is not expressed in so many words, e.g. "The water contacts signal the alarm" (Abstract), "the pair of water contacts being electrically coupled with the battery" (claim 1), "the alarm mechanism including circuitry being electrically coupled with the pair of water contacts . . . the alarm mechanism being electrically coupled with the battery." (claim 1) It is further assumed that these "water contacts", plural, are two in number, as implied by the phrase "the pair of water contacts" in claim 1 and as shown in FIG. 3, though only one is identified therein, as the other is represented identically to, though spaced apart from, the one properly identified with the reference numeral "48" by nearly the entire diameter of the housing 18, with well over the entire length of a standard nine volt battery between the two, i.e., over three inches apart.

These "water contacts" of Shrewsbury-Gee are contrasted with the two parallel conductive rods of Jaeger which, judging by the drawings which represent a bath tub and what is assumed to be four standard D or possibly C size dry cell type batteries, are less than one and one half inches apart from each other as the distance between the two is less than the diameter of each battery shown. No dimensions are given in either reference and it is merely assumed that the batteries are accurately represented and the drawings are made somewhat to scale, however, it occurs to one that either the conductive rods of Jaeger would unknowingly constitute the "water contacts" of Shrewsbury-Gee or the "water contacts" of the latter disclosure are not actually closing an electrical series circuit including batteries and alarm but perhaps providing a 'signal' as described which somehow results in activation of the alarm, despite these "water contacts" being "electrically coupled with the battery", the battery being singular and the means of activation, if other than completion of a series circuit by the water, remaining wholly obscure.

One hence finds a rather similar situation in this most pertinent art with that in the art relating to automatic control of bath tubs wherein certain physical activities are less than fully lucid. It is considered that water can conduct electricity but is not typically rated as an electrical conductor. Water is, by standard measures, a borderline dielectric with a resistance of $0.5 \times 10^6$ ohms per cm at 18° C. The dielectric value of water decreases with increase in temperature and is 75 at 35° C. which is about the temperature of a good hot bath. This compares with a resistivity of copper of 1.7 micro ohm cm at 20° C. Nylon, a common insulator, has an electrical resistance of $4 \times 10^{14}$ ohms cm at 23° C.

Water is hence closer in electrical resistance to nylon than it is to copper, but water can still conduct electricity, at least that available from household current, i.e. 110 volts alternating current, and with sufficient amperage is known to have the capability of killing a person in a bath. The point is that while water will carry electricity it also has a moderate resistance and a whole bath tub of water would therefore rather quickly drain a common nine volt battery of the type represented in the drawings provided by the Shrewsbury-Gee disclosure if "electrically coupled" as the phrase is understood.

The larger point is that, given the amount of prior art concerned specifically with providing an alarm for remotely, i.e. audibly, indicating an overflow or desirably full condition, which is further characterized by various means for closing the electrical circuit invariably utilized for sounding the alarm, the matter of providing this contact is recognized as crucial to satisfactory address of the problem concerned. The earlier art specifically pertinent to the matter is relatively unconcerned with the possibility of water short circuiting the alarm apparatus while the later art is generally much concerned with the same threat: the contacts and circuitry disclosed by Arbib are wholly exposed though disposed above the highest level of water anticipated; the contacts disclosed by Jaeger are similarly exposed and elevated with regard to the water though the bulk of the electrical equipment, i.e. the battery and bell alarm are placed in a covered box; the device disclosed by Polikoff is similarly elevated above the water line and covered with a box but has the bottom open; the more recent disclosure of Eagle places the alarm exteriorly to the tub, the battery inside an enclosure and the contact above a tube in which a rather long float is confined; the device disclosed by Peso uses a float configuration with an extension; Barnes uses a magnet on top of a float to trigger a proximity switch and puts the alarm outside the tub; Shrewsbury-Gee uses barrier walls to shield the electrical circuitry and apparatus from water.

It is further remarked that the disclosure of Barnes would seem to succeed in preventing the possibility of short circuiting the alarm by unintended contact with water but that this achievement relies upon use of a proximity switch, which is an exceedingly delicate mechanism, together with disposal of the alarm exteriorly to a tub wall.

Statement of Need

It is hence considered, in review of the pertinent prior art as discussed above, that the seemingly simple matter of sounding an alarm in response to a predetermined level of water in a bath tub is one which contains an inherent problem which has yet to be satisfactorily resolved: an electrical contact must be closed by the rising level of the water but water will readily short circuit the device if permitted direct communication with the electrical contact it must close. The use of a proximity switch is considered problematic due to the inherent fragility of the mechanism and mere removal of the alarm and power supply from the immediate vicinity of the interior of the tub and hence the water therein is regarded as similarly unsatisfactory because of the likelihood that water splashed out of the tub or another source in the bathroom will still cause problems.

A need is therefore considered to exist for a means of closing the electrical contact necessary of an alarm indicating a given level of water in a bath tub which is proof against the threat of short circuiting posed by the presence of water in a bathroom. A need is hence recognized, in other words, for a bath water level alarm which is waterproof.

SUMMARY OF THE INVENTION

Objects of the Invention

The encompassing objective of the present invention is a waterproof device attachable to an interior surface of a bath tub wall which provides an audio alarm indicating the attainment of a pre-determined height by the level of water in a bath tub.

A first ancillary objective of the present invention is a waterproof electrical switch which is closed by a rising water level.

A second ancillary objective of the present invention is a waterproof audio annunciator.

A third ancillary objective of the present invention is a waterproof electrical switch which is closed by a rising water level and is vertically compact.

Further ancillary objectives of the present invention encompass a waterproof electrical switch which is closed by a rising water level and is of: durable, reliable, and inexpensive construction.

A first auxiliary objective of the present invention is a waterproof electrical on/off switch.

A second auxiliary objective of the present invention is a removable power supply which is waterproof.

A third auxiliary objective of the present invention is a waterproof device which provides an audio alarm indicating the water level in a bath tub attaining a pre-determined height which is removably attachable to an interior surface of a bath tub wall.

A fourth auxiliary objective of the present invention is a waterproof device which provides an audio alarm indicating the water level in a bath tub attaining a pre-determined height which also provides a visual indication of operative state.

A fifth auxiliary objective of the present invention is a waterproof device which provides an audio alarm indicating the water level in a bath tub attaining a pre-determined height which also provides a substantially horizontal platform for soap.

Principles Relating to the Present Invention

As indicated by the above stated objects of the present invention it is considered that a device which provides audio indication of the water in a bath tub attaining a predetermined height must be waterproof and must include the following components: (a) means of attachment to an interior surface of a bath tub wall; (b) an electrical contact closed by a rising water level; (c) an audio annunciator; (d) a power supply. It is further considered that such a device preferably include: (e) an electrical on/off switch; (f) a removable power supply; (g) means of removable attachment to an interior surface of bath tub wall; (h) a vertically compact activation switch; (i) a horizontal platform for the disposition of a bar of soap; and (j) visual indication of operative state. It is further desired that the device be reliable and inexpensive in construction.

It has been suggested that a crucial aspect of a such a device is the electrical switch closed by a rising water level; that fundamental problems arise in waterproofing this switch such as excessive vertical length, fragility, and expensive construction.

It is suggested that what is herein known as a diaphragm switch which is compact, reliable and inexpensive may be provided by a fixed upper contact element within a waterproof housing and a lower contact element attached to the interior surface of a flexible membrane, i.e. diaphragm, comprising a lower surface of the housing. While the housing is waterproof and hence relatively air tight, air is a gas and hence compressible while water is liquid and incompressible. The flexible membrane under the influence of gravity prior communication with the rising water level depends downward and a lower electrical contact upon the interior, upper, surface of the membrane is spaced apart from the fixed upper electrical contact thereby defining an open state. When the water rises to the level of the dependent flexible membrane is pushed upward by the compression of the air within the housing by the incompressible water beneath the flexible membrane thereby pressing the lower contact element upon the interior surface of the flexible membrane against the upper electrical contact element closing the diaphragm switch and completing a circuit including the power supply and audio annunciator.

This configuration is considered to be very compact vertically and fairly compact horizontally, requiring less than a quarter inch in height, and less than an inch in diameter with a circular diaphragm when operationally disposed. Some additional height is required by the audio annunciator and on/off switch with location of these components above the power supply which configuration is considered desirable to ensure an elevation of both components superior to the level of the water in the bath at the time that the inflow of water is terminated thus ensuring that the water level does not exceed that of the annunciator emitting the alarm initiated by closing of the diaphragm switch. The top of a preferred configuration in accordance with the principles relating to the present invention is further above the waterline resultant to immersion of one's body but below the top of the wall of the tub to which the device is attached. This positioning suggests that the top surface of the device would provide a suitable location for disposing a bar of soap.

It is necessary that the whole device be waterproof including the audio annunciator and the on/off switch. The speaker of a preferred annunciator has a magnet mounted upon the back of a waterproof vibratory diaphragm which is displaced by an electromagnet and sealed to the housing of the device to ensure that the annunciator is waterproof. It is suggested that the on/off switch be sealed with a flexible diaphragm, preferably a constructed from a translucent elastomeric, bonded peripherally to the housing of the device. A push button type electrical switch catching in closing and releasing in opening with alternating applications of pressure is recommended. A visual indicator such as a Light Emitting Diode (LED), Liquid Crystal Diode (LCD) or simple incandescent light bulb is also suggested which is preferably supplied by power with closing of this on/off switch.

The power supply is preferably removable and the means enabling this must be waterproof. A threaded attachment, further preferably including a gasket, is considered the best known means of providing this ability and for this reason a cylindrically shaped power supply such as a 'D' cell battery is preferred. Other types of fastening which would suit the parallelpiped shape of a 9 volt transistor battery including a rectangular gasket such as a catch, detent, or at least one screw perpendicular to a rectangular door would also suffice.

It is also recommended that at least one suction cup, i.e. vacuum device, be utilized to provide adhesion to an interior surface of a wall of a tub. Suction cups are well suited to wet environments and work best with a smooth surface such as that found on a wall of a typical bath tub which is constructed of cast iron and covered with enamel. Permanent means of attachment such as epoxy may also be utilized by a means enabling attachment but a removable means of attachment is much preferred.

Other details regarding what is considered the best manner of making and using a device in accordance with the principles relating to the present invention may be appreciated with a reading of the detailed description below, especially if conducted with reference to the drawings attached hereto and described briefly as follows.

DETAILED DESCRIPTION OF THE PREFERRED EMBODIMENT

Figure 2:
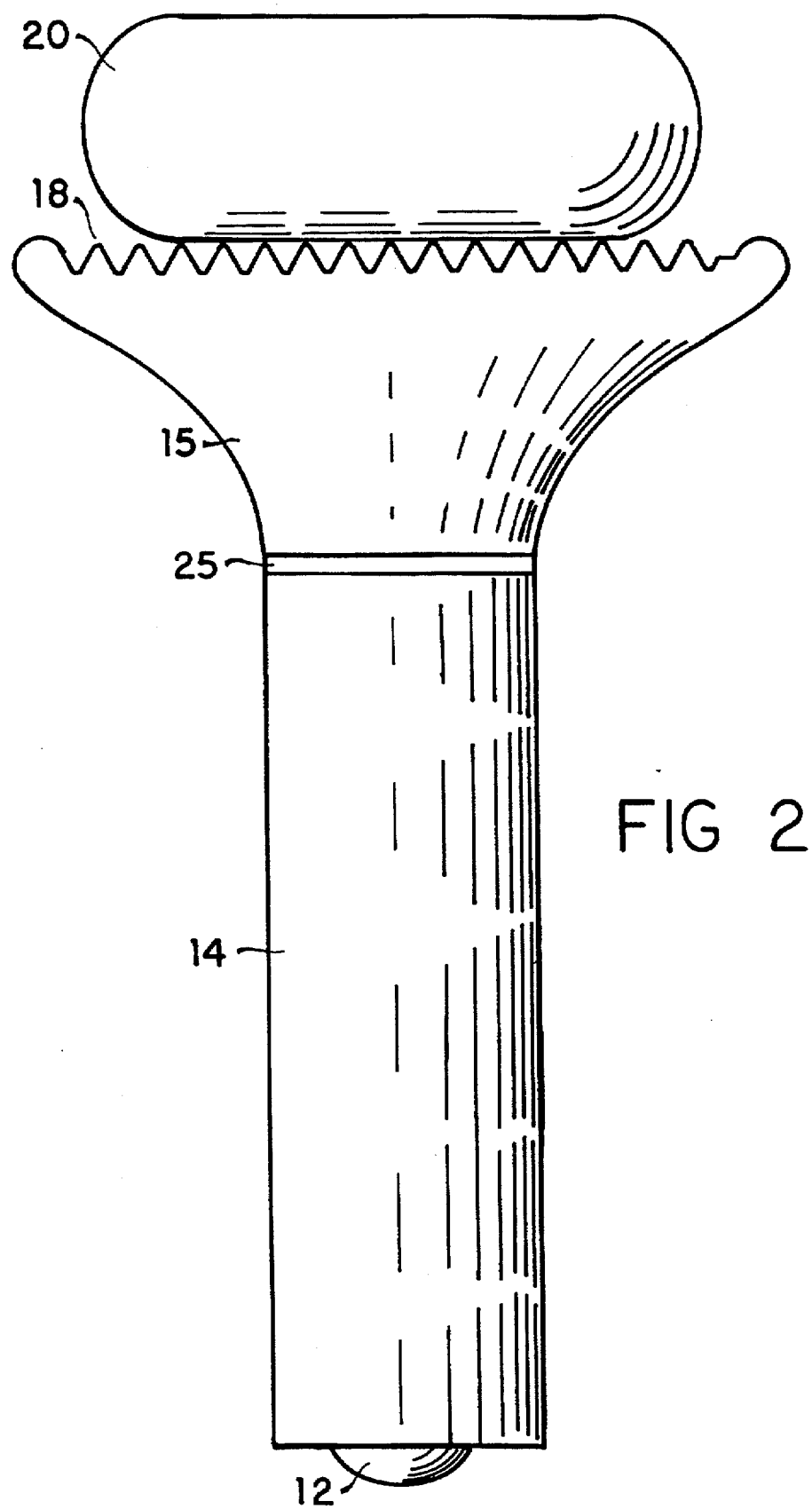
FIG. 2 is a plain elevational side view taken from the front of the preferred embodiment of the principles relating to the present invention of FIG. 1 depicting the diaphragm switch in an open position.

FIG. 2 depicts a device 10 comprising a preferred embodiment of the principles relating to the present invention in a frontal view with a bar of soap bar 20 on top. At the bottom a rounded protuberance may be discerned constituting the visible exterior portion of a diaphragm switch 32 in a dependent, open, position under the influence of gravity comprised of a flexible membrane 12 possessing a waterproof seal about the perimeter in attachment to the lower housing portion 14 of the device 10.

Figure 1:
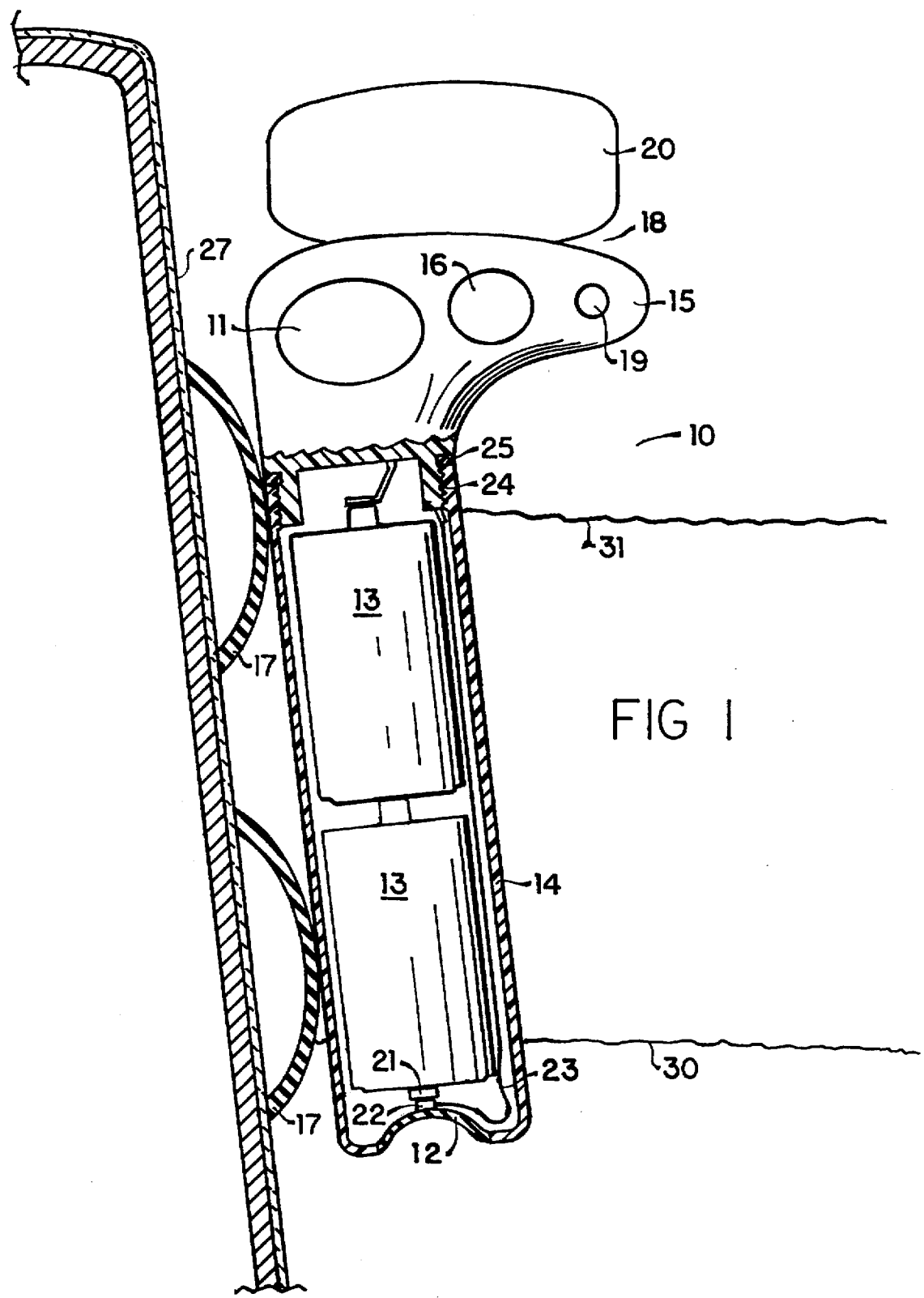
FIG. 1 is a plain elevational side view taken from the side of a preferred embodiment of the principles relating to the present invention partially cut away to illustrate the power supply and diaphragm switch in a closed position.
Figure 3:
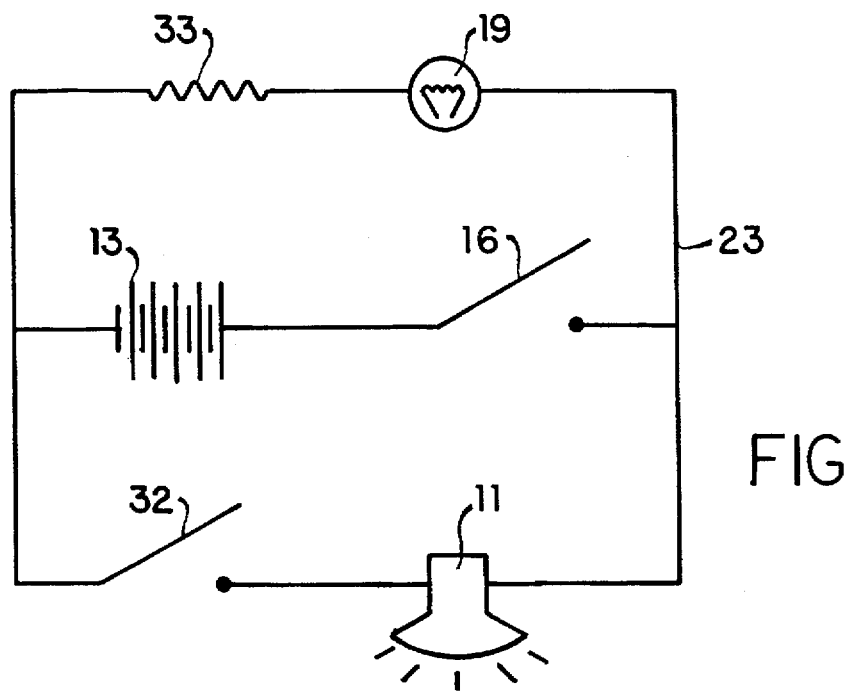
FIG. 3 is an schematic representing the electrical circuit of a preferred embodiment of the principles relating to the present invention.

FIG. 1 depicts the device 10 of FIG. 2 in a lateral view partially cut away to reveal internal components and depicting the diaphragm switch 32 in a closed position as effected by the waterline 30 having attained a height superior to that of the flexible membrane 12 and whereby a lower contact element 22 attached to the upper, interior, surface of the flexible membrane 12 has been pressed into communication with an upper contact element 21 by the pressure of the water in a bath tub thereby completing the main circuit represented schematically in FIG. 3 comprised of an annunciator 11, at least one battery 13, an on/off switch 16, wiring 23 and diaphragm switch 32.

FIG. 3 also schematically represents an ancillary circuit comprised of at least one battery 13, the on/off switch 16, a visual power indicator 19, a resistor 33 and wiring 23. The main circuit also possesses electrical resistance, of course, but it is desirable for the ancillary circuit to possess additional resistance so that when both switches 16, 32 are closed more current will flow through the main circuit than the ancillary circuit and so that when the on/off switch 16 is closed and the diaphragm switch 32 is open the visual indicator 19 is protected. In operation closing of the on/off switch 16 will light the visual indicator 19 and when the diaphragm switch 32 is also closed the annunciator 11 will be activated sounding an audio alarm signal and dimming the visual indicator 19. The brightness of the visual indicator 19 with the on/off switch 16 closed and the diaphragm switch 32 open will also yield an indication of the relative strength of the battery 13 and forewarn of the need to replace the same.

It is preferred, as earlier mentioned and as clearly shown in FIG. 1 that two 'C' or 'D' size 1.5 volt standard dry cell batteries 13 be utilized in series with one on top of the other. Replacement of these batteries 13 is facilitated by threading 24, preferably male, given to the top of the lower housing portion 14 mating with threading 24, preferably female, given to an appropriately sized aperture in the bottom of the upper housing portion 15. With this preferred configuration the lower housing portion 14 is, as shown, preferably cylindrical in shape. A circular gasket 25 is further preferably provided constructed of natural rubber or other elastomeric material in order to ensure a waterproof seal.

The bottom housing portion 14 and the upper housing portion 15 are both preferably constructed of plastic resin by an injection molding and each possesses a hollow interior and preferably possess a substantially uniform wall thickness in order to facilitate molding. The annunciator 11 is preferably constructed with a vibrating waterproof diaphragm bonded about the periphery to a periphery of an appropriately sized aperture through the upper housing portion 15. A waterproof diaphragm is similarly bonded to the periphery of an appropriately sized aperture through the upper housing portion 15 in order to waterproof the on/off switch 16 which is of a push button type which closes and opens with alternating applications of pressure upon the same in a preferred embodiment of the principles relating to the present invention.

Two different waterlines 30, 31 are also shown in FIG. 1. The lower waterline 30 depicts the level of water in a tub prior to immersion of someone into the same, after the diaphragm switch 32 has been closed by the pressure of the water against the bottom, exposed, surface of the flexible membrane 12 and the inflow of water into the tub has been terminated and the alarm silenced by release of the on/off switch 16. The upper waterline 31 depicts the level of water in a tub after immersion of someone into the same. It is fuher noticed that a pair of suction cups 17 are depicted in adhesion to an interior surface 27 of a tub wall which provide removable attachment of the device 10 to said surface 27 and which permits adjustment of the height of the device 10 thereby adjusting the level of the water which closes the diaphragm switch 32.

The bar of soap 20 seen in FIGS. 1 & 2 on top of the device 10 rests upon a platform 18 comprising the top surface of the device 10. This platform 18 is further preferably shaped to permit draining of water from the soap onto the platform 18 and off the same into the tub. Neither this aspect nor the visual indicator 19 nor the on/off switch 16 are necessary components to an embodiment in accordance with the principles relating to the present invention. The platform 18 for a bar of soap is strictly optional, the visual indicator 19 is considered desirable but obviously not strictly necessary and the on/off switch 16 is not strictly necessary either so long as the device 10 possesses removable means of attachment such as the suction cups 17 which comprise the preferred means of attachment.

It is considered that so long as the device 10 is removably attachable to an interior surface 27 of a bath tub wall the device 10 may be readily deactivated with either removal of the same from the tub or otherwise repositioning the device 10 so that the flexible diaphragm 12 is no longer pressed upward by the water in the tub. The platform 18 for a bar of soap 20 might still be useful in this case but it is recognized that a smaller and simpler embodiment of the principles relating to the present invention lacking the on/off switch 16 most notably, thereby requiring displacement of the device 10 in order to silence the alarm emitted by the annunciator 11, would render the platform 18 for the soap less desirable as the absence of this feature would further contribute to diminish the overall size and bulk of the resultant device 10.

It is also considered that if the on/off switch 16 were omitted from an embodiment of the principles relating to the present invention the utility of the visual indicator 19 would also be virtually eliminated as the main function of the visual indicator 19 is to indicate that the on/off switch 16 is in the on position. Simple omission of the on/off switch 16 from the electrical schematic represented in FIG. 3 would have the visual indicator 19 on at all times which would constitute an undesirable drain upon the battery 13 and if the visual indicator 19 were incorporated into the resulting main circuit it would constitute a mere redundancy with the annunciator 11. The visual indicator 19 is hence considered a desirable feature ancillary to inclusion of an on/off switch 16.

The vertical distance, i.e. height, required of the diaphragm switch 23 is well under one centimeter, i.e. less than three eighths of an inch, with as little as one eighth of an inch (0.85 cm) being sufficient. With regard to the horizontal dimension a circular shape of the flexible membrane 12 is considered preferable and a diameter of no more than one inch (2.54 cm) is required. Given these rather modest vertical and horizontal dimensional requirements of the diaphragm switch 23 it is considered that the remaining components of the structure of the device basically define the size required vertically and horizontally.

The power supply is considered the most spatially demanding of the components required. A standard 'C' size battery is two inches long, with a diameter just under one inch. A 'D' cell battery is just over two and three eighths of an inches in length and has a diameter of 2.3 inches. Both types provide 1.5 volts and the use of two in series, as depicted in FIG. 1, yields 3 volts and a height of either four or 4.6 inches which is approximately equivalent to the difference in the water level anticipated by the immersion of a human body into a typical bath, as depicted by the two different waterlines 30 & 31 in FIG. 1.

This dimension varies considerably, of course, according to the horizontal surface of the bath and the volume of the body immersed therein. The salient point concerns the level of the water in the bath relative to the device 10. The waterline 30 after activation of a diaphragm switch 23 located on the bottom surface of the device 10 when the inflow of water is terminated is shown in FIG. 1 as about one half to one inch above the diaphragm switch 23, while immersion of one's body into the bath will likely attain a height equal to or exceeding the height of two 'C' or 'D' size batteries 13 disposed in series, thereby placing the top of a casing enclosing said batteries 13 at about the resultant waterline 31.

Figure 4:
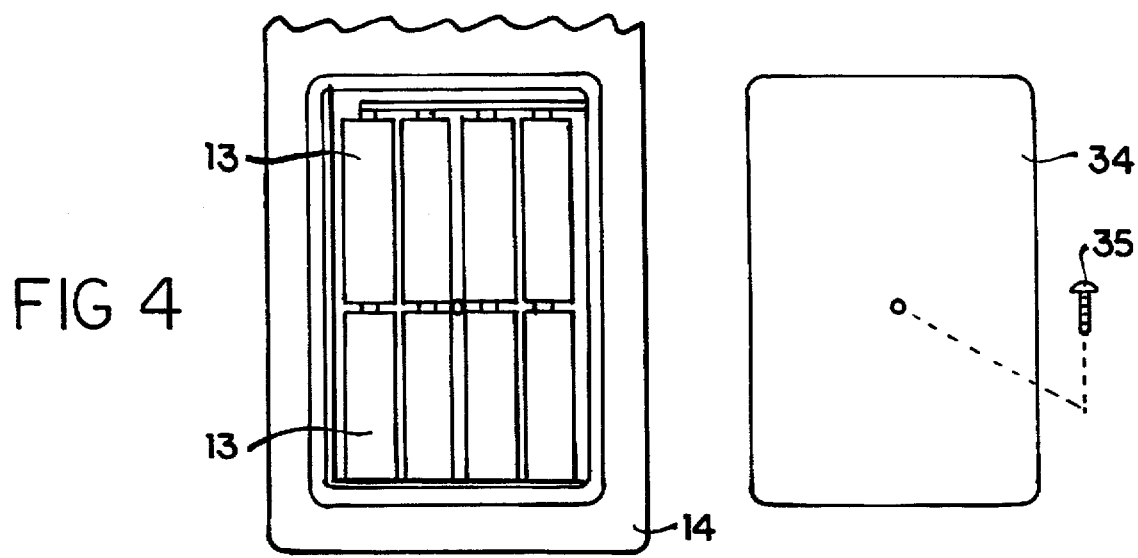
FIG. 4 is a partial plain elevational view taken from the front of an embodiment of the principles relating to the present invention cutaway to illustrate an alternate power supply to that depicted in FIG. 1.

A smaller 'AA' size, as shown in FIG. 4, or what is commonly known as a nine volt transistor battery would also certainly suffice as a power supply. The eight 'AA' size batteries 13 depicted in FIG. 4 arranges four parallel pairs batteries 13 connected in series yields a power supply of six volts and more compact dimensions than the power supply depicted in FIGS. 1 & 2. 'AA' batteries 13 are slightly more than one half of an inch in diameter (0.55") and nearly two inches (1.98") in length.

The power supply depicted in FIG. 4 is hence comprised of an arrangement of batteries 13 approximately two and a quarter inches wide, four inches in height and less than nine-sixteenths of an inch thick. By omitting a suitable platform 18 for disposing a bar of soap 20 and locating the annunciator 11, and the on/off switch 16 and visual indicator 19 upon the top of the device 10 facing upward the resultant overall dimensions of the device 10 may readily be held to a width of 2.5 inches, a height of five inches and a thickness of three-quarters of an inch.

It will further be noticed that the power supply depicted in FIG. 4 is accessible and replaceable through a substantially rectangular door and that waterproofing is ensured by a substantially rectangular gasket 25 in combination with a centrally located bolt 35 normal, i.e. perpendicular, to the door 34 and passing through the same, threading into an appropriately formed aperture in the back of the lower housing portion 14. It is not necessary that the batteries 13 comprising the power supply of a device 10 in accordance with the principles relating to the present invention be removable in order to facilitate replacement, but this feature is preferred. At least one battery 13 might be permanently incased in the device 13 which might be disposable or further possess a port for recharging the battery 13 therein and in neither case is the power supply replaceable.

It is emphasized, moreover, that the foregoing has been intended to provide one practiced in the art with what is considered to be explicatory of what is considered to be the best manner of making and using an embodiment of the principles relating to the present invention and is not to be interpreted as being in any manner restrictive of either the scope of the invention disclosed herein or the rights and privileges secured by Letter Patent for which I hereby claim:

1. A device intended to remotely indicate the attainment of a predetermined level of water in a bath tub, said device comprising:

a waterproof housing possessing a hollow interior, a lower housing portion having at least one aperture therethrough covered by a flexible membrane, and an upper housing portion having one at least one aperture therethrough covered by a vibrating membrane;

attachment means for attaching said waterproof housing to an interior surface of a bath tub possessing the capability of maintaining said housing in an immobile position with respect to said interior surface of said bath tub;

an electrical circuit enclosed inside said housing interior electrically connecting a power supply comprising at least one battery enclosed within said interior of said housing, an annunciator, an upper fixed contact, and a lower moving contact attached to an interior surface of said flexible membrane;

said annunciator having the capability of sounding an alarm exteriorally of said housing utilizing said vibrating membrane when said electrical circuit is completed;

said flexible membrane possessing a seal with said lower portion of said housing about one said aperture therethrough and sufficient flexibility to be pressed by a rising water level from a dependent position to an upward position whereby said lower moving contact is pressed against said upper fixed contact thereby completing said electrical circuit and causing said annunciator to sound an alarm.

2. The device of claim 1 wherein said upper housing portion possesses a top surface suitable for use as a platform for a bar of soap.

3. The device of claim 1 wherein said attachment means for attaching said waterproof housing to an interior surface of a bath tub permits removable attachment.

4. The device of claim 3 wherein said attachment means permitting removable attachment utilize at least one suction cup.

5. The device of claim 4 wherein said removable attachment means utilize at least two suction cups.

6. The device of claim 1 wherein said electrical circuit further includes an on/off switch which in an open position opens said electrical circuit.

7. The device of claim 6 wherein said on/off switch is disposed inside said housing adjacent to one said aperture through said upper housing portion which is covered by a flexible membrane sealed about a perimeter to said upper housing portion about said aperture.

8. The device of claim 6 further including a visual indicator upon said upper housing portion included in said electrical circuit which is activated when said on/off switch is in a closed position.

9. The device of claim 8 wherein said visual indicator is connected as an opposed parallel leg to the annunciator and said upper and lower contacts with respect to said power supply and said on/off switch.

10. The device of claim 9 further including a resistor within said leg including said visual indicator.

11. The device of claim 1 possessing a portion of said housing which is removable wherein each said battery is removable from said interior of said housing thereby permitting replacement of each said battery.

12. The device of claim 11 wherein a rotatable exteriorly threaded member mating with an appropriately interiorly threaded aperture of said housing secures said portion of said housing which is removable.

13. The device of claim 11 wherein said removable portion of said housing is substantially planar and possesses a substantially rectangular perimeter.

14. The device of claim 13 wherein the power supply possesses a substantially rectangular perimeter.

15. The device of claim 14 wherein the power supply is comprised of a plurality of cylindrical batteries.

16. The device of claim 11 wherein at least one cylindrical battery is utilized as the power supply.

17. The device of claim 16 wherein at least two cylindrical batteries arranged in a series is utilized as the power supply.

18. The device of claim 11 wherein threading is utilized in attachment of said portion of said housing which is removable.

19. The device of claim 18 wherein said lower housing portion is threaded in attachment of said upper body portion of said housing.

20. The device of claim 19 further including a resilient gasket disposed between opposed portions of said housing.

* * * * *